(12) United States Patent
Smith

(10) Patent No.: US 6,276,211 B1
(45) Date of Patent: *Aug. 21, 2001

(54) METHODS AND SYSTEMS FOR SELECTIVE PROCESSING OF TRANSMIT ULTRASOUND BEAMS TO DISPLAY VIEWS OF SELECTED SLICES OF A VOLUME

(75) Inventor: Stephen W. Smith, Durham, NC (US)

(73) Assignee: Duke University, Durham, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,390

(22) Filed: Feb. 9, 1999

(51) Int. Cl.$^7$ .................................................. G01N 29/06
(52) U.S. Cl. ........................................... 73/626; 600/447
(58) Field of Search ........................... 73/626, 625, 602; 600/447, 440

(56) References Cited

U.S. PATENT DOCUMENTS

| | | |
|---|---|---|
| 4,694,434 | 9/1987 | von Ramm et al. ...................... 367/7 |
| 5,546,807 | 8/1996 | Oxaal et al. ............................ 73/606 |

OTHER PUBLICATIONS

Shattuck et al., "Explososcan: A parallel processing technique for high speed ultrasound imaging with linear phased arrays," *J. Acoust. Soc. Am*, vol. 75, No. 4, Apr. 1984, pp. 1273–1282.

Snyder et al., "Real–Tim Orthogonal Mode Scanning of the Heart. I. System Design," *J. Amer. Coll. Cardiol.*, vol. 7, Jun. 1986, pp. 1279–1285.

von Ramm et al., "High–Speed Ultrasound Volumetric Imaging System—Part II: Parallel Processing and Image Display," *IEEE Transactions of Ultrasonics, Ferroelectrics, and Frequency Control*, vol. 38, No. 2, Mar. 1991, pp. 109–115.

*Primary Examiner*—John E. Chapman
(74) *Attorney, Agent, or Firm*—Myers Bigel Sibley & Sajovec (57) ABSTRACT

A configuration of slices of a volume, such as B slices, I slices, and/or C slices, is selected. Subsequently, the volume is scanned based on the selected configuration of slices. For example, transmit ultrasound beams are transmitted from an ultrasound transducer downstream into the volume through a selected slice. The transmit ultrasound beams are tracked downstream in the volume until the transmit ultrasound beams reach points that lie in a plane that corresponds to the selected slice of the volume. The tracking is used to form ultrasound scan lines which represent the portion of the volume through which the transmit ultrasound beams were tracked. The ultrasound scan lines are used to provide a view of the plane that corresponds to the selected slice. The transmit ultrasound beams are not tracked downstream from the plane in the volume that corresponds to the selected slice. Alternately, B slices of the volume are selected. Transmit ultrasound beams are transmitted into the volume until two planes of the volume which represent the selected B slices are scanned. Consequently, a 3D ultrasound imaging system which operates as described above may be capable of reducing the time needed to provide a view of the selected slice compared to conventional systems. The time reduction may allow an increase in the data acquisition rate.

30 Claims, 7 Drawing Sheets

METHODS AND SYSTEMS FOR SELECTIVE PROCESSING OF TRANSMIT ULTRASOUND BEAMS TO DISPLAY VIEWS OF SELECTED SLICES OF A VOLUME

FIELD OF THE INVENTION

The present invention relates to the field of imaging in general and more particularly to ultrasound imaging.

BACKGROUND OF THE INVENTION

One of the challenges in generating Three Dimensional (3D) ultrasound images may be the high data acquisition rate needed to scan tissue at a desired rate (such as 22 scans per second (sps)). The data acquisition rate may be a function of the size of the volume scanned, including depth, and the desired frame rate. For example, the data acquisition rate of a 3D ultrasound imaging system that performs 22 sps may need to increase as the size of the volume scanned increases. It is known to increase the data acquisition rate of 3D ultrasound imaging systems by using parallel receive processing. Parallel receive processing for a conventional 3D ultrasound imaging system is discussed in U.S. Pat. No. 4,694,434 entitled "Three-Dimensional Imaging System" to von Ramm and Smith which is incorporated herein by reference.

Figure 1:
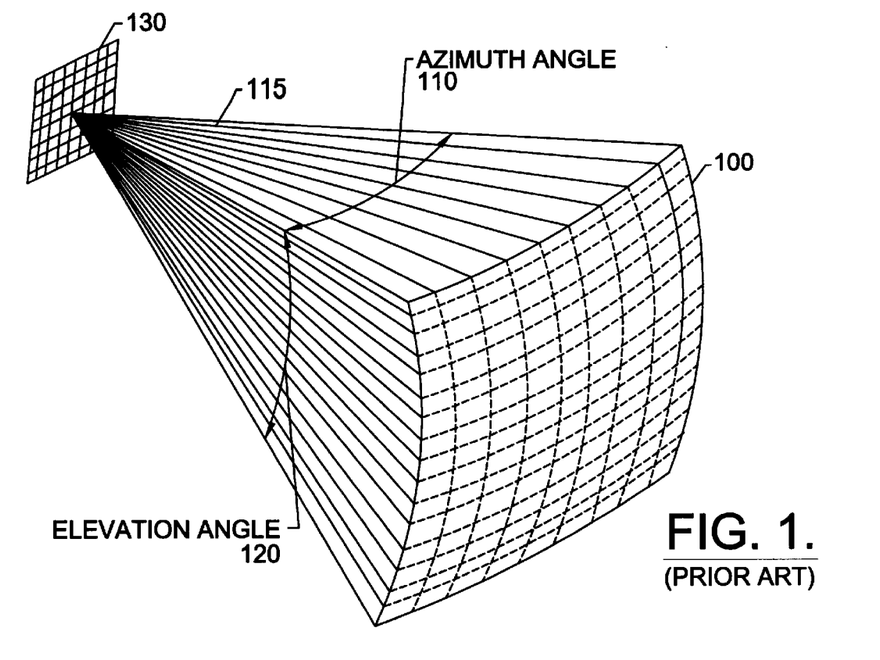
FIG. 1 is a diagram of a volume scanned by ultrasound beams into the volume over an azimuth and elevation using a 2D array of ultrasound transducer elements.

As shown in FIG. 1, a volume 100 may be scanned by steering ultrasound beams 115 into the volume 100 over an azimuth angle 110 and an elevation angle 120 using a two dimensional (2D) array of ultrasound transducer elements 130. For example, the volume 100 may be scanned by steering 256 ultrasound beams into the volume 100 (16 transmit ultrasound beams through an azimuth angle of 65 degrees combined with 16 transmit ultrasound beams through an elevation angle of 65 degrees). The 256 ultrasound beams may be processed using parallel receive processing to form 4096 ultrasound scan lines (16 ultrasound scan lines formed for each transmit ultrasound beam transmitted). Accordingly, parallel receive processing may be used to increase the data acquisition rate by a factor of 16. However, increasing the data acquisition rate further using parallel receive processing may be prohibitively expensive to implement and may adversely affect the quality of images generated by conventional 3D ultrasound imaging systems.

The ultrasound scan lines may be used to provide a three dimensional (3D) data set that represents the volume 100. Conventionally, the 3D data set may be manipulated by a user to view selected portions of the volume. For example, the user may select slices of the volume for viewing. Accordingly, the 3D data set may be accessed to provide the data which corresponds to the selected slices of the volume 100 which is then displayed.

As described in U.S. Pat. No. 5,546,807 entitled "High Speed Volumetric Ultrasound Imaging System" to Oxaal et al., which is incorporated herein by reference, a volume is scanned to provide a representative 3D data set which is stored in a memory. Subsequently, slices of the volume 100 may be selected by the user. The data which corresponds to the selected slices of the volume 100 is retrieved from the memory and displayed. The selected slices may be B-mode (B) slices, Constant Depth (C) slices, and Inclined (I) slices as shown in FIGS. 2–4 respectively.

Figure 2:
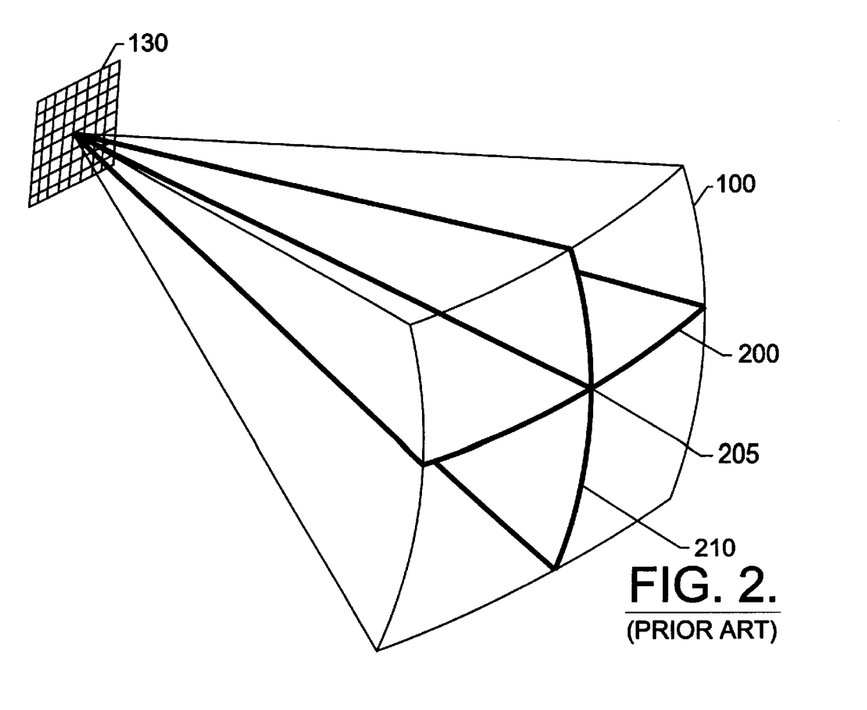
FIG. 2 is a diagram of two orthogonal B slices selected from a volume for viewing according to the prior art.
Figure 3:
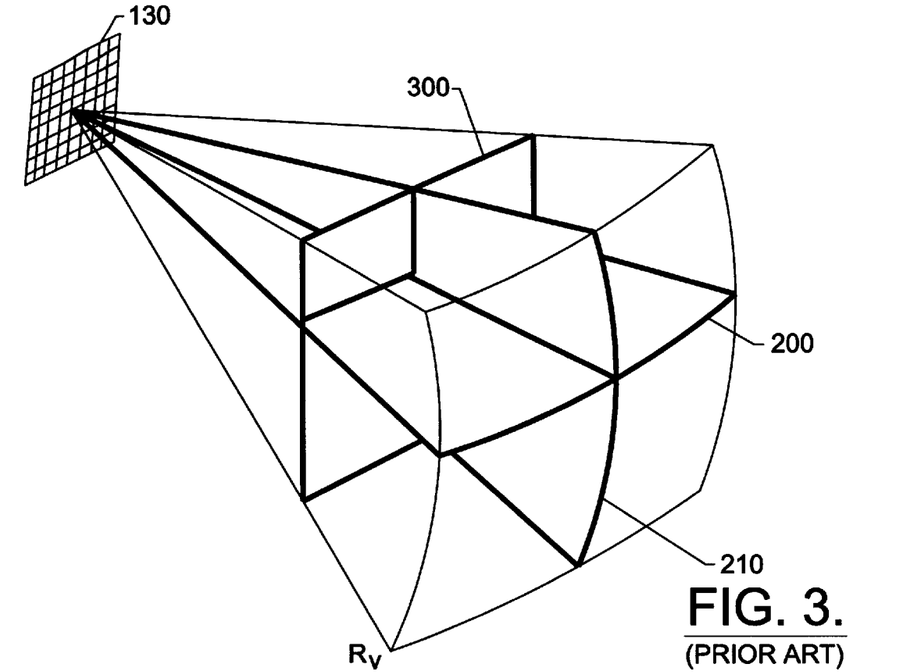
FIG. 3 is a diagram of a C slice and two orthogonal B slices selected for viewing from a volume according to the prior art.
Figure 4:
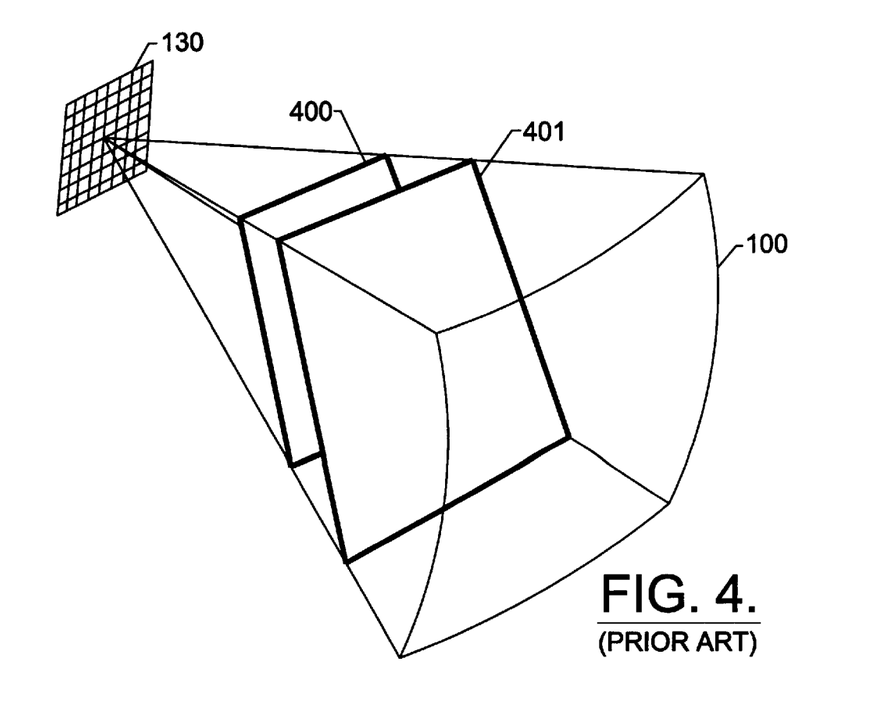
FIG. 4 is a diagram of two I slices selected for viewing from the volume according to the prior art.

FIGS. 2–4 illustrate slices of the volume 100 selected for viewing as described in Oxaal et al. As shown in FIG. 2, the volume 100 is scanned to a range 205 and B slices 200, 210 are selected for viewing, whereupon the data which corresponds to the selected B slices is retrieved from the 3D data set to provide views of the B slices 200, 210. As shown in FIG. 3, a C-slice 300 may also be selected from the 3D data set for viewing. Accordingly, the data which corresponds to the C slice 300 is selected from the 3D data set and displayed. As shown in FIG. 4, first and second I slices 400, 401 are selected from the 3D data set for viewing. In particular, the first I slice 400 is tilted in the volume 100 so that the top of the first I slice 400 is closer to the 2D array of ultrasound transducer elements than the bottom of the first I slice 400. Similarly, the second I slice 401 is tilted in the volume 100 so that the top of the second I slice 401 is closer to the 2D array of ultrasound transducer elements than the bottom of the second I slice 401.

Unfortunately, the time needed to scan the volume 100 in each of the cases shown in FIGS. 2–4 may limit the data acquisition rate of conventional 3D ultrasound imaging systems. For example, a conventional 3D ultrasound imaging system may need to complete a first scan of the volume 100 before starting a second scan. Therefore, the size of the volume 100 may limit the data acquisition rate of the conventional 3D ultrasound imaging system.

It is also known to use two orthogonal linear arrays to produce two orthogonal B slices as described in "Real-Time Orthogonal Mode Scanning of the Heart. I. System Design," J. Amer. Coll. Cardiol., Vol. 7, 1986, pp. 1279–1285 by Snyder et al., which is incorporated herein by reference. Unfortunately, the system discussed by Snyder et al. may not be capable of scanning B slices which are oriented at a non-orthogonal angle with respect to each other and the two dimensional array of ultrasound transducer elements.

As described above, the data acquisition rate of conventional 3D ultrasound imaging systems may need to be increased as the size of the volume scanned is increased or as the desired frame rate is increased. The size of the volume scanned may be increased by increasing the depth of the scan or increasing the angle over which the scan is performed. For example, increasing the data acquisition rate may allow an increase in the azimuth angle from 60° to 80°. Alternatively, increasing the data acquisition rate may be used to provide deeper scans while maintaining a desired fame rate. Accordingly, there is a need to further increase the data acquisition rate of 3D ultrasound imaging systems.

SUMMARY OF THE INVENTION

It is, therefore, an object of the present invention to allow an improvement in 3D ultrasound imaging systems.

It is a further object of the present invention to allow an increase in the data acquisition rate of 3D ultrasound imaging systems.

These and other objects of the present invention are provided by selecting a configuration of slices of a volume which is to be scanned from a plurality of configurations. Subsequently, the volume is scanned based on the selected configuration of slices. In particular, B slices, I slices, and/or C slices may be selected as the configuration of slices of the volume to be scanned. The volume is then scanned based on which slice configuration was selected. For example, if an I slice is selected as the slice configuration the volume is scanned based on the I slice configuration which provides a 3D data set that represents the portion of the volume located upstream from the I slice. The portion of the volume located downstream from the I slice is not scanned.

Consequently, a 3D ultrasound imaging system which operates according to the present invention may be capable of reducing the time needed to provide a view of the selected slice compared to conventional systems. For example, the time saved by not tracking a transmit ultrasound beam downstream from a selected slice may allow the next transmit ultrasound beam to be transmitted sooner, thereby reducing the time needed to scan the volume. The time reduction may allow an increase in the data acquisition rate which may allow the volume to be scanned more times per a unit of time. Scanning the volume more times may increase the signal-to-noise ratio of the images produced by a system according to the present invention. In general, scanning the volume more times may allow noise in the scans to be reduced by averaging the noise over time. The reduction in time may be estimated by comparing the respective sizes of the entire volume and the portion of the volume through which the transmit ultrasound beams are tracked.

In one embodiment of the present invention, transmit ultrasound beams are transmitted downstream from an ultrasound transducer through a selected slice to a scan range. The transmit ultrasound beams are tracked downstream in the volume until the transmit ultrasound beams reach respective points on a plane in the volume which corresponds to the selected slice. The transmit ultrasound beams are not tracked through a portion of the volume which is downstream from the selected slice.

In another embodiment of the present invention, a plurality of transmit ultrasound beams are transmitted downstream from an ultrasound transducer until first and second B slices of the volume are scanned, wherein one of the first and second B slices defines a non-orthogonal angle with respect to the face of the ultrasound transducer. Accordingly, the volume is scanned using the B slices needed to provide a view of the selected B slices, which may allow a reduction in the time needed to provide the selected B slices. Consequently, the time saved by not scanning portions of the volume which are not needed to provide the views of the selected slices may be used to begin a new scan, thereby allowing an increase in the data acquisition rate.

In another aspect of the present invention, the slices are selected before the transmit ultrasound beams are transmitted into the volume. For example, a user may select the slices to be viewed via a user interface. A processor determines the locations of the selected slices in the volume. An processor controls the tracking of the transmit ultrasound beam based on the locations of the selected slices.

In a further aspect of the present invention, the selected slices may comprise a combination of I slices, B slices, and C slices. For example, a C slice and two B slices may be selected for viewing. The 3D ultrasound imaging system according to the present invention tracks the transmit ultrasound beams to provide a 3D data set which includes ultrasound scan lines that correspond to a portion of the volume upstream from the selected C slice to the ultrasound transducer through which the transmit ultrasound beams propagate and ultrasound scan lines which correspond to the two selected B slices from the ultrasound transducer downstream, through the selected C slice, to a scan range. Consequently, the portions of the volume downstream from the selected C slice which do not lie in the planes which correspond to the selected B slices are not included in the 3D data set.

DETAILED DESCRIPTION OF PREFERRED EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The components of the 3D ultrasound imaging systems described herein may be packaged as a single unit or packaged separately and interconnected to provide the functions described herein. The term "tissue" includes blood and organs such as those found in a human body, such as a heart.

The term "tracking" refers to the use of parallel receive processing to form ultrasound scan lines from the transmit ultrasound beams transmitted into the volume.

The ultrasound scan lines provide a 3D data set that represents the volume of tissue through which the transmit ultrasound beams were tracked. For example, if the tracking of a plurality of transmit ultrasound beams stops when the plurality of transmit ultrasound beams reach a location in the volume, the 3D data set provided represents the portion of the volume though which the tracking was performed to the location and not the remaining portion of the volume. The term "scanning" or "scanned" refers to the transmission of ultrasound beams into a volume and tracking the transmit ultrasound beams in the volume to provide a 3D ultrasound image. For example, a 3D ultrasound image of a volume may be provided by entirely scanning the volume with a first scan followed by entirely scanning the volume with a second scan and so on.

Although the present invention is described as being used to generate 3D ultrasound images, it will be understood that the present invention may be utilized to provide M-mode, spectral Doppler, color flow, or power mode data. Like numbers refer to like elements throughout.

Figure 5:
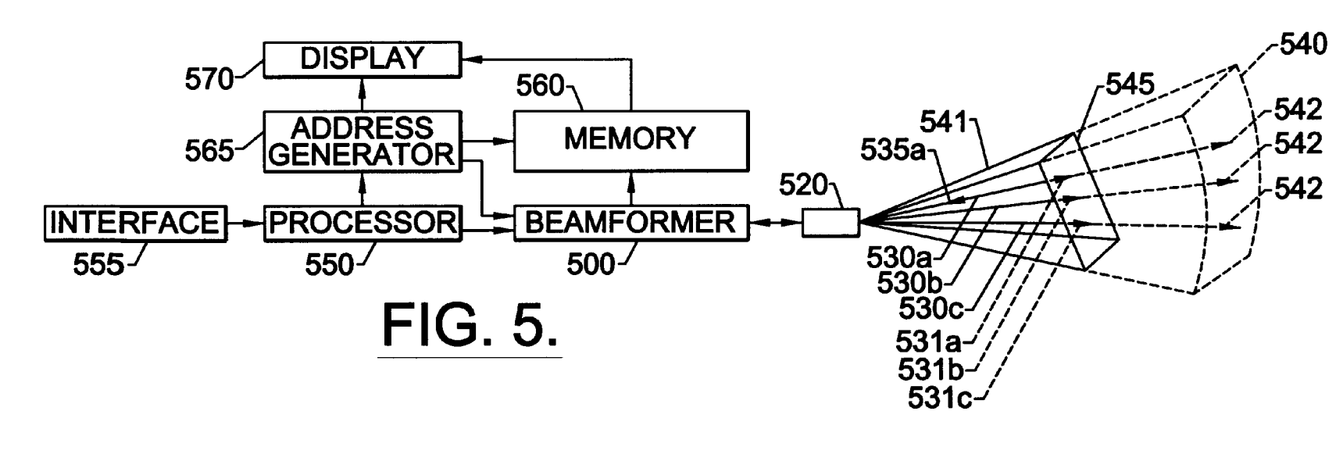
FIG. 5 is a block diagram of a 3D ultrasound imaging system that scans a truncated volume according to a first embodiment of the present invention.

FIG. 5 is a block diagram of a Three Dimensional (3D) ultrasound imaging system that scans a truncated volume 541 in a volume 540 according to a first embodiment of the present invention. A user selects a configuration of slices of the volume 540 to be scanned and viewed on a display 570 from a plurality of configurations.

The display 570 may comprise a Cathode Ray Tube (CRT), Liquid Crystal Display (LCD) or other display known to those having skill in the art. The plurality of configurations includes B slices, I slices and C slices and combinations thereof. The volume 540 is then scanned based on the configuration of slices selected by the user. For example, if an I slice is selected as the slice configuration, the volume is scanned based on the I slice configuration which provides a 3D data set that represents the portion of the volume located upstream from the I slice. The portion of the volume located downstream from the I slice is not scanned.

The time saved by not scanning the portion of the volume located downstream from the I slice may allow a first scan to be completed sooner and a second scan of the volume 540 to begin, thereby reducing the time needed to scan the volume 540 and allow an increase in the data acquisition rate of the system.

Transmit ultrasound beams 530a, 530b, 530c are transmitted from an ultrasound transducer 520 into the volume 540 downstream through a selected slice 545 to a scan range 542. The ultrasound transducer 520 may comprise 256 ultrasound transducer elements arranged as an array of 16×16 ultrasound transducers elements that may be independently excited. The transmit ultrasound beams are formed by exciting selected ultrasound transducer elements of the ultrasound transducer 520 at predetermined times under the control of a beamformer 500 according to techniques known to those of skill in the art.

The beamformer 500 also tracks the transmit ultrasound beams 530a, 530b, 530c downstream until they reach respective points 531a, 531b, 531c in the volume 540 which lie in a plane of the volume 540 that corresponds to the selected slice 545. The tracking of the transmit ultrasound beams produces ultrasound scan lines which are used to provide a 3D data set which is stored in a memory 560. The processor 550 accesses the data included in the 3D data set that represents the selected slice 545. The accessed data is provided to the display 570 which generates a view of the selected slice 545.

The slice 545 is selected using an interface 555 connected to the processor 550. For example, the user may select three points in the volume 540 which define a plane in the volume 540 that corresponds to the selected slice 545. In a preferred embodiment, the processor 550 controls the tracking of the transmit ultrasound beams based on the coordinates of the plane. For example, the location of selected slice 545 in the volume 540 indicates how long the transmitted ultrasound beams need to be tracked by the beamformer 500 to obtain enough data to provide a view of the selected slice 545. It will be understood that the tracking may be controlled by an address generator 565 wherein the coordinates of the plane are used by the processor 550 to determine how long the transmit ultrasound beams should be tracked.

The slices may be an arbitrary thickness. The processor 550 may comprise a computer such as an engineering workstation or personal computer or a processor dedicated to controlling the overall operation of the 3D ultrasound imaging system of FIG. 5. The interface 555 may comprise a track ball, a light pen, a mouse, a tablet, a keyboard, or other input device known to those having skill in the art. The address generator 565 determines the addresses needed to retrieve data from the 3D data set stored in the memory 560. For example, the address generator determines the needed addresses based on a storing perspective selected by the user as described in U.S. Pat. No. 5,546,807 to Oxaal et al. The needed data is provided to the display 570 to display views of the selected slices. The selected slices may comprise single or multiple I slices, B slices, C slices and combinations thereof.

The transmit ultrasound beams 530a, 530b, 530c are not tracked through a portion of the volume 540 located downstream from the selected slice 545. Consequently, the 3D ultrasound imaging system may be capable of reducing the time needed to provide a view of the selected slice 545 compared to conventional systems. The time reduction may allow an increase in the data acquisition rate. The time reduction may be estimated by comparing the difference between the volume 540 and the truncated volume 541 through which the transmit ultrasound beams are tracked. For example, the reduction in time, $t_r$, can be expressed as:

$$t_r = \frac{V}{V_t} \quad (1)$$

where V is the volume of the volume 540 and $V_t$ is the volume of the truncated volume 541. Consequently, the time made available by the reduction in time, $t_r$, may be used to begin a new scan earlier, thereby allowing an increase in the data acquisition rate and thus an increase in the signal-to-noise ratio.

The transmit ultrasound beams 530a, 530b, 530c represent a plurality of transmit ultrasound beams used to scan the volume 540. For example, the volume 540 may be scanned by transmitting 256 transmit ultrasound beams and tracking the 256 transmit ultrasound beams using receive mode parallel processing to form 4096 ultrasound scan lines (16 ultrasound scan lines formed for each of the 256 transmit ultrasound beams). The 4096 ultrasound scan lines represent the truncated volume 541 which extends from the ultrasound transducer 520 downstream to the plane that corresponds to the selected slice 545.

Figure 6:
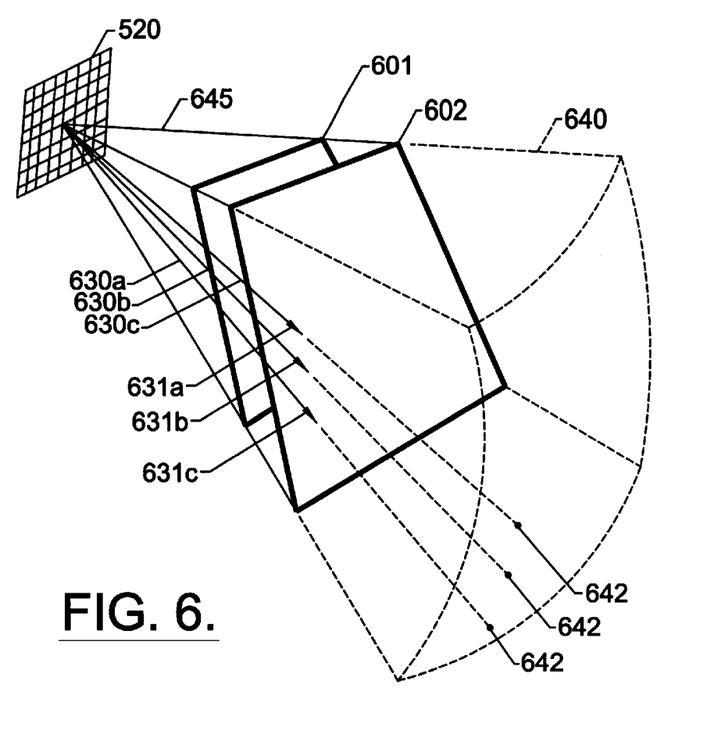
FIG. 6 is a diagram of first and second I slices selected from a volume scanned by a 3D ultrasound imaging system according to the present invention.

FIG. 6 is a diagram of first and second I slices 601, 602 selected from a volume 640 scanned by a 3D ultrasound imaging system according to the present invention. According to FIG. 6, transmit ultrasound beams 630a, 630b, 630c are transmitted from the ultrasound transducer 520 into the volume 640 downstream through the selected slice 602 to a scan range 642. The beamformer 500 tracks the transmit ultrasound beams 630a, 630b, 630c (under the control of the processor 550) downstream until they reach respective points 631a, 631b, 631c in the volume 640 which lie in a plane that corresponds to the selected slice 602. The tracking produces the 3D data set that is stored in the memory 560. The transmit ultrasound beams are not tracked downstream from the selected I slice 602 to the scan range 642. The processor 550 accesses data included in the 3D data set that represents the selected I slices 601, 602. The accessed data is provided to the display 570 that generates views of the selected slices 601, 602.

Figure 7A:
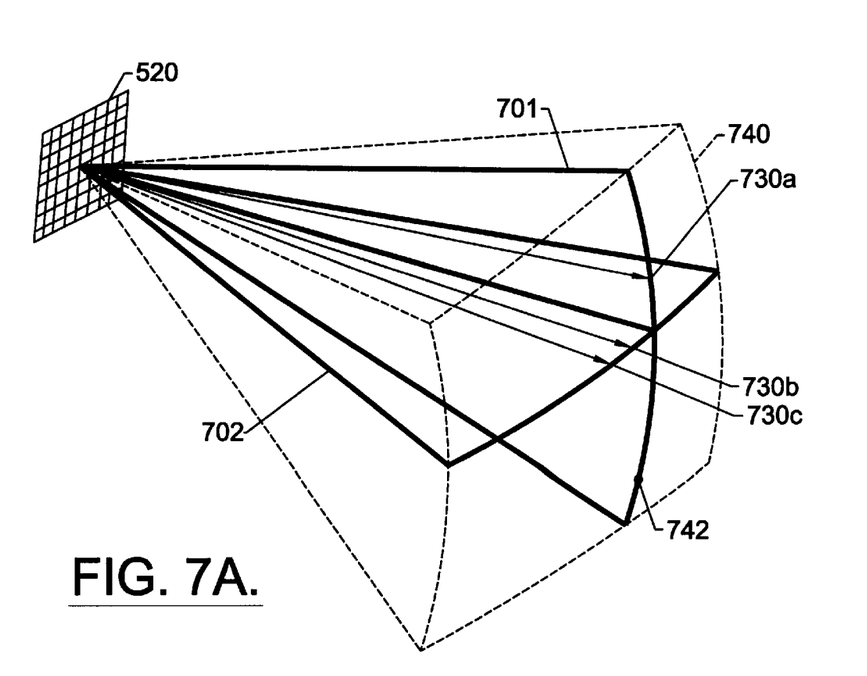
FIG. 7A is a diagram of a first embodiment of first and second B slices selected from a volume according to the present invention.

FIG. 7A is a diagram of a first embodiment of first and second B slices 701, 702 selected from a volume 740 scanned by a 3D ultrasound imaging system according to the present invention. According to FIG. 7A, the first and second B slices 701, 702 are selected for viewing via the interface 555. The transmit ultrasound beams 730a, 730b, 730c are transmitted in a B-mode pattern from the ultrasound transducer 520 into the volume 740 downstream to a scan range 742 until the first and second B slices 701, 702 of the 740 volume are scanned.

According to the present invention, one of the first and second B slices defines a non-orthogonal angle with respect to the face of the ultrasound transducer 520. The selected B slices may be at any angle with respect to each other. For example, as shown in FIG. 7A, the B slice 701 defines a non-orthogonal angle with the respect to the face of the ultrasound transducer while the first and second B slices define an orthogonal angle with respect to each other. The beamformer 500 tracks the transmit ultrasound beams 730a, 730b, 730c to provide the 3D data set which is stored in the memory 560.

Figure 7B:
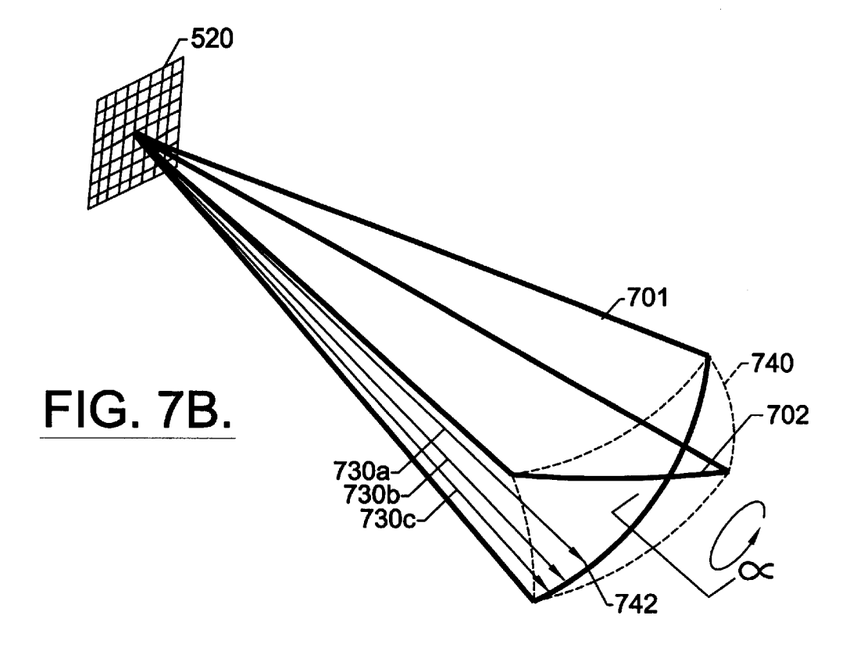
FIG. 7B is a diagram of a second embodiment of first and second non-orthogonal B slices selected a volume scanned by a 3D ultrasound imaging system according to the present invention.

FIG. 7B is a diagram of a second embodiment of first and second non-orthogonal B slices 701, 702 selected from the volume 740 scanned by a 3D ultrasound imaging system according to the present invention. According to FIG. 7, the first and second B slices 701, 702 are selected for viewing via the interface 555. The transmit ultrasound beams 730a, 730b, 730c are transmitted in a B-mode pattern from the ultrasound transducer 520 into the volume 740 downstream to the scan range 742 until the first and second B slices 701, 702 of the 740 volume are scanned. As shown in FIG. 7B, the first and second B slices define a non-orthogonal angle with respect to each other and the face of the transducer. The selected B slices may be at any angle with respect to each other. The beamformer 500 tracks the transmit ultrasound beams 730a, 730b, 730c to provide the 3D data set which is stored in the memory 560. Furthermore, it will be understood hat transmit ultrasound beams 730a, 730b, 730c represent a plurality of transmit ultrasound beams needed to scan the first and second B slices 701, 702.

Consequently, the 3D ultrasound imaging system according to the present invention transmits transmit ultrasound beams into the volume 740 until enough data has been processed to provide views of the selected B slices 701, 702, whereupon transmission of transmit ultrasound beams for a first scan stops. Subsequently, a second scan may begin earlier which may reduce the time needed to provide the views of the selected B slices 701, 702 and thereby increase the data acquisition rate.

Figure 8:
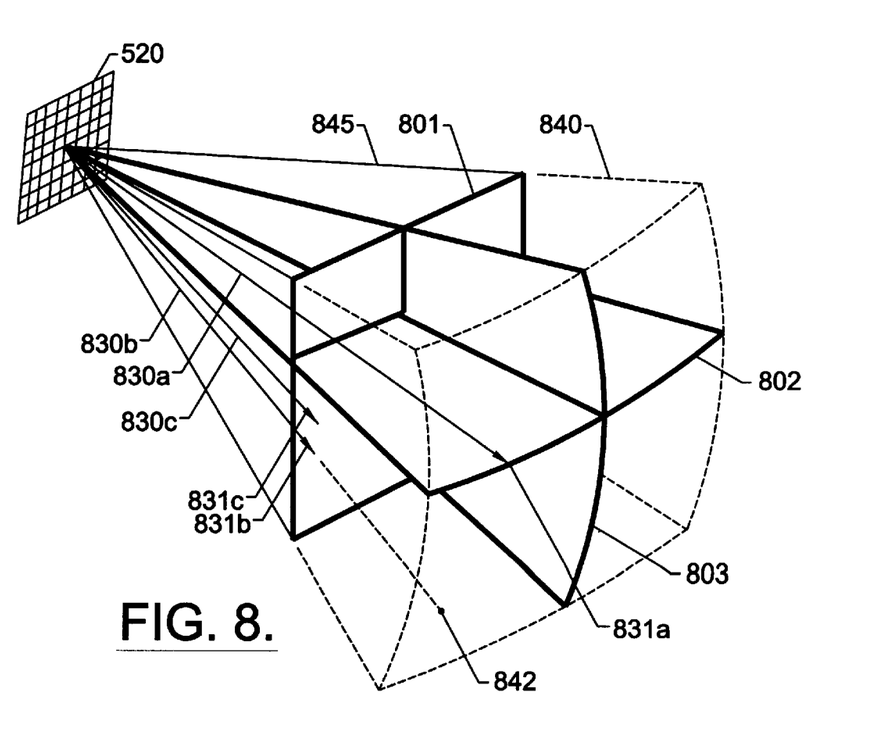
FIG. 8 is a diagram of a C slice and first and second B slices selected for viewing in a volume scanned by a 3D ultrasound imaging system according to the present invention.

FIG. 8 is a diagram of a C slice 801 and first and second B slices 802, 803 selected from a volume 840 scanned by a 3D ultrasound imaging system according to the present invention. According to FIG. 8, the C slice 801 and the first and second B slices 802, 803 are selected for viewing via the interface 555. The transmit ultrasound beams 830a, 830b, 830c are transmitted into the volume 840 downstream from the ultrasound transducer 520 to a scan range 842. It will be understood that transmit ultrasound beams 830a, 830b, 830c represent a plurality of transmit ultrasound beams needed to scan the truncated volume 845 and the first and second B slices 802, 803.

The beamformer 500 tracks the transmit ultrasound beams 830b, 830c (under the control of the processor 550) downstream until they reach respective points 831b, 831c in the volume 640 which lie in a plane that corresponds to the selected C slice 801. The tracking produces the 3D data set which represents the truncated volume 845. The transmit ultrasound beams 830b, 830c are not tracked downstream beyond the plane that represents the selected C slice 801 to the scan range 842. The processor 550 accesses data included in the 3D data set that represents the selected C slice 801. The accessed data is provided to the display 570 which generates a view of the selected C slice 801.

The tracking of the transmit ultrasound beams, such as transmit ultrasound beam 830a, which lie in planes that represent the first and second selected B slices 802, 803 does not end at points which lie in the plane that represents the selected C slice 801. Rather, the tracking of the transmit ultrasound beam 830a continues downstream in the volume 840 until the transmit ultrasound beam 830a reaches a location 831a at the scan range 842. The selected B slices 802, 803 may be at any angle with respect to each other.

The Beamformer

Referring again to FIG. 5, the beamformer 500 provides excitation, such as electrical signals, to the ultrasound transducer 520 (which may be mounted in an ultrasound probe) that converts the excitation to ultrasound pressure waves that propagate through the volume 540. The ultrasound transducer 520 may comprise a plurality of ultrasound transducer elements arranged in an array and electrically connected to the beamformer 500.

Each excited ultrasound transducer element produces a corresponding pressure wave that is timed to constructively combine with pressure waves generated by other ultrasound transducer elements at a predetermined angle and range in the tissue. The constructive combination of the pressure waves forms a transmit ultrasound beam which propagates in the volume 540 according to the phasing of the electrical signals which form the transmit ultrasound beam. Consequently, phasing of the excitations to the plurality of ultrasound transducer elements enables the transmitted ultrasound beam to be steered within the volume 540.

The beamformer 500 generates electrical signals which produce the plurality of transmit ultrasound beams 530a, 530b, 530c from the ultrasound transducer 520, to insonify the volume 540. As the transmit ultrasound beam 530a propagates in the volume 540, a portion of the transmit ultrasound beam may be reflected back towards the ultrasound transducer 520 in the form of a reflected pressure wave. For example, when the transmit ultrasound beam 530a encounters tissue having different acoustical impedance, a reflected pressure wave 535a is generated which propagates in the volume 540 back towards the ultrasound transducer 520. As the pressure wave 530a continues to propagate and encounters more tissue having different acoustical properties, new reflected pressure waves are created. Accordingly, a plurality of reflected pressure waves are created by the propagation of the transmit ultrasound beam 530a in the volume 540. Although not shown, it will be understood that each of the transmit ultrasound beams 530b, 530c create respective reflected pressure waves that are analogous to the reflected pressure wave 535a.

The ultrasound transducer 520 converts the plurality of reflected pressure waves created by the transmit ultrasound beam 530a to electrical signals which are processed by the beamformer 500 to generate a corresponding ultrasound scan line. Moreover, the beamformer 500 uses parallel receive processing to form a plurality of ultrasound scan lines for each transmit ultrasound beam. The ultrasound scan lines provide the 3D data set which represents the portion of the volume 540 through which the transmit ultrasound beams are tracked (located downstream from the ultrasound transducer 520 to the selected slice 545).

In a preferred embodiment, the processor 550 controls the beamformer 500 so that the volume is scanned based on a configuration of slices selected by the user. For example, in the embodiment of FIG. 6, the processor 550 controls the beamformer 500 so that the transmit ultrasound beams 530a, 530b, 530c are tracked downstream from the ultrasound transducer 520 to the selected slice 545, whereupon the processor 550 stops the tracking of the transmit ultrasound beams. The point at which the tracking stops is based on the respective point 531a, 531b, 531c at which each transmit ultrasound beam 530a, 530b, 530c intersects the selected slice 545 in the volume 540.

Alternatively, in the embodiment of FIG. 7, the processor 550 controls the beamformer 500 so that the transmit ultrasound beams are transmitted until the B slices in the configuration selected by the user are defined, whereupon no other transmit ultrasound beams are transmitted for the present scan.

In one embodiment, the selected slice 545 in the volume 540 is represented by the three points provided by the user. The three points are used to define an equation of a plane in the volume 540 that corresponds to the selected slice 545. The equation of the plane is used to determine the time for the transmit ultrasound beam to propagate from the ultrasound transducer 520 to a respective point in the plane. Accordingly, reflected pressure waves generated at locations in the volume 545 downstream from the plane are not tracked. For example, the transmit ultrasound beams 530a, 530b, 540c each intersect the plane which represents the selected slice 545 at respective points 531a, 531b, 531c. therefore, each transmit ultrasound beam 530a, 530b, 530c is tracked until it reaches the respective point 531a, 531b, 531c in the plane that represents the selected slice 545.

The processor 550 determines the time needed for the transmit ultrasound beams 530a, 530b, 530c to reach the respective points 531a, 531b, 531c in the plane using the speed of sound in the medium (about 1.54 mm/µs for tissue). Therefore reflected pressure waves received after a total propagation time equal to the time needed for the transmit ultrasound beam to propagate to the respective point in the plane and a corresponding reflected pressure wave to propagate back to the ultrasound transducer 520 are not processed by the beamformer 500 and not included in the 3D data set.

For example, the three points (U, V, W) selected by the user may be expressed as:

$$U = x_1, y_1, z_1 \quad (2)$$

$$V = x_2, y_2, z_2 \quad (3)$$

$$W = x_3, y_3, z_3 \quad (4)$$

where x, y, z are Cartesian coordinates of the selected points in the volume 540. Using equations (2), (3), and (4) the general equation of the plane which corresponds to the selected slice 545 is:

$$ax + by + cz = 0 \quad (5)$$

where a, b, and c are coefficients derived using mathematical techniques known to those of skill in the art. In the embodiments of FIGS. 5, 6 and 8, the processor 550 determines the total propagation time for a pressure wave to propagate along a line from the ultrasound transducer 520 to a corresponding point in the plane given by equation (5) and the corresponding reflected pressure wave to propagate back to the ultrasound transducer 520. Accordingly, reflected pressure waves received later from the same transmitted pressure wave are not tracked.

Figure 9A:
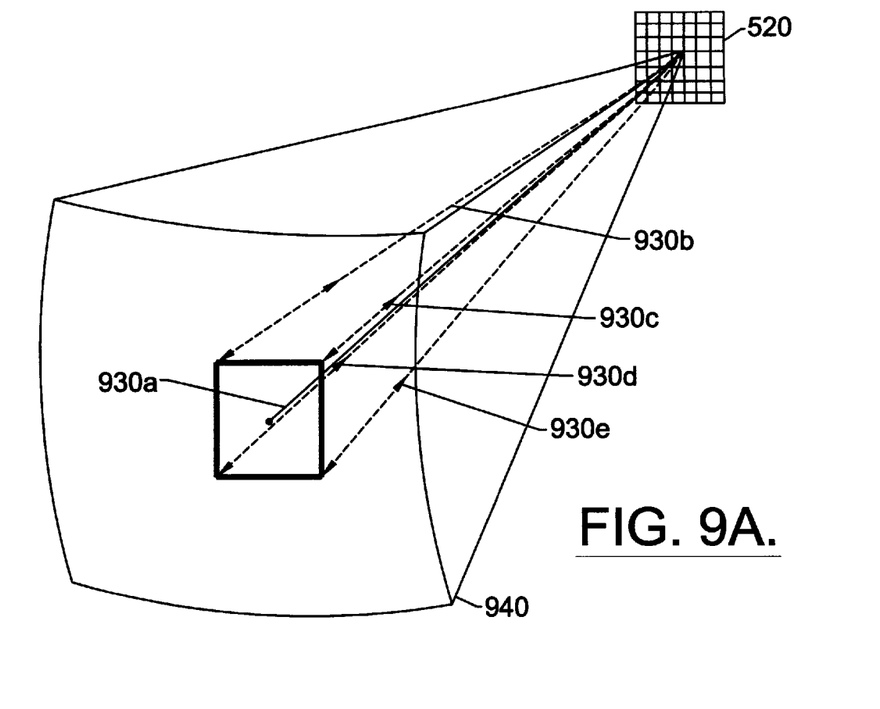
FIG. 9A is a diagram that illustrates a volume scanned using parallel receive processing.
Figure 9B:
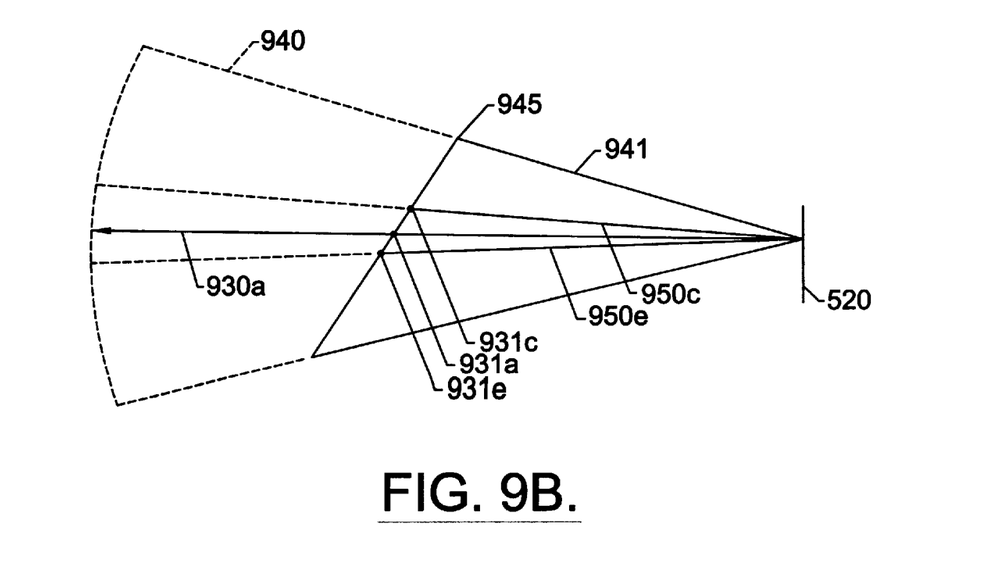
FIG. 9B is a view that illustrates the scanning of a truncated volume according to the present invention.

Moreover, the processor 550 controls the tracking of the ultrasound scan lines formed via the parallel receive processing as shown in FIGS. 9A and 9B. As shown in FIG. 9A, a transmit ultrasound beam 930a is transmitted into a volume 940. Dotted lines 930b, 930c, 930d, 930e represent the respective propagation paths of reflected pressure waves (created by the transmit ultrasound beam 930a) processed by the beamformer 500 using 4:1 parallel receive processing. According to FIG. 9B, each of the dotted lines can be defined by an equation of the respective dotted line in the volume 940.

FIG. 9B is a side view of the volume 940 including an I slice 945 scanned by a 3D ultrasound imaging system according to the present invention. First and second points 931c, 931e represent the intersection of the respective dotted lines 930c, 930e with a plane in the volume 940 which corresponds to the selected I slice 945. Accordingly, the processor 550 determines a total propagation time which includes the time needed for a pressure wave to propagate through the volume 940 via the path followed by the transmit ultrasound beam and a corresponding reflected pressure wave to propagate back to the ultrasound transducer 520 via the respective dotted line. For example, to form an ultrasound scan line 950c using parallel receive processing, the processor 550 determines a total propagation time which includes the time needed for the transmit ultrasound beam 930a to propagate to a point 931a in the plane of the volume 940 which corresponds to the selected I slice 945 and the time needed for a corresponding reflected pressure wave to propagate back to the ultrasound transducer 520 from a point 931c via a path represented by the dotted line 930c. Reflected pressure waves received at the ultrasound transducer 520 after the total propagation time are not tracked.

Moreover, the processor 550 determines the total propagation time for each ultrasound scan line formed. Consequently, a truncated volume 941 may be scanned faster than the volume 940, thereby allowing an increase in the data acquisition rate of a 3D ultrasound system according to the present invention.

In a preferred embodiment of the present invention, the processor 550 controls the scanning of the volume by issuing instructions to the beamformer 500 that indicate how to steer the transmit ultrasound beams in the volume and for how long to track each transmit ultrasound beam. The processor 550 stores instructions for scanning the volume based on the B, I, and C slices selected for viewing. A set of instructions controls the beamformer to scan a predetermined slice of the volume. For example, when the user selects a B slice to be scanned, the processor 550 uses stored instructions which correspond to the selected B slice to control the scanning of the volume by the beamformer 500. In an alternate embodiment, the beamformer 500 is controlled dynamically to provide a view of the selected slices in accordance with the present invention.

For example, in one embodiment 192 sets of instructions are stored for scanning B slices: 64 B slices in azimuth, 64 B slices in elevation, and 64 B slices in α as shown in FIG. 7. Each set of instructions causes the beamformer 500 to scan an associated B slice. When the user selects a configuration of slices which includes one of the 192 B slices the processor 550 uses the associated instruction set to cause the beamformer 500 to scan the selected B slice. The beamformer 500 provides excitations to the ultrasound transducer to steer the transmit ultrasound beams in the volume to scan the selected B slices of the volume.

In another embodiment, 64 C slices of the volume can be selected for viewing wherein each C slice is parallel to the face of the transducer. Accordingly, the 64 slices divide the entire volume into 64 different truncated volumes. The stored instructions are used to control the time that the beamformer 500 tracks each transmit ultrasound beam. For example, in a system that generates 256 transmit ultrasound beams, the instructions for a selected C slice control the tracking time for the 256 transmit ultrasound beams. Furthermore, if 16:1 parallel receive processing is used to track the transmit ultrasound beams, the instructions control the tracking time needed to provide 4096 ultrasound scan lines (16×256).

In still another embodiment, 256 I slices can be selected for viewing wherein each I slice is tilted with respect to the face of the ultrasound transducer. The I slice can be tilted in 16 positions in azimuth and 16 positions in elevation (256 I slices). The stored instructions for each I slice are used by the processor to control the tracking of the transmit ultrasound beams generated to scan the volume. Furthermore, if 16:1 parallel receive processing is used to track the transmit ultrasound beams, the instructions control the tracking time needed to provide 4096 ultrasound scan lines (16×256).

Figure 9C:
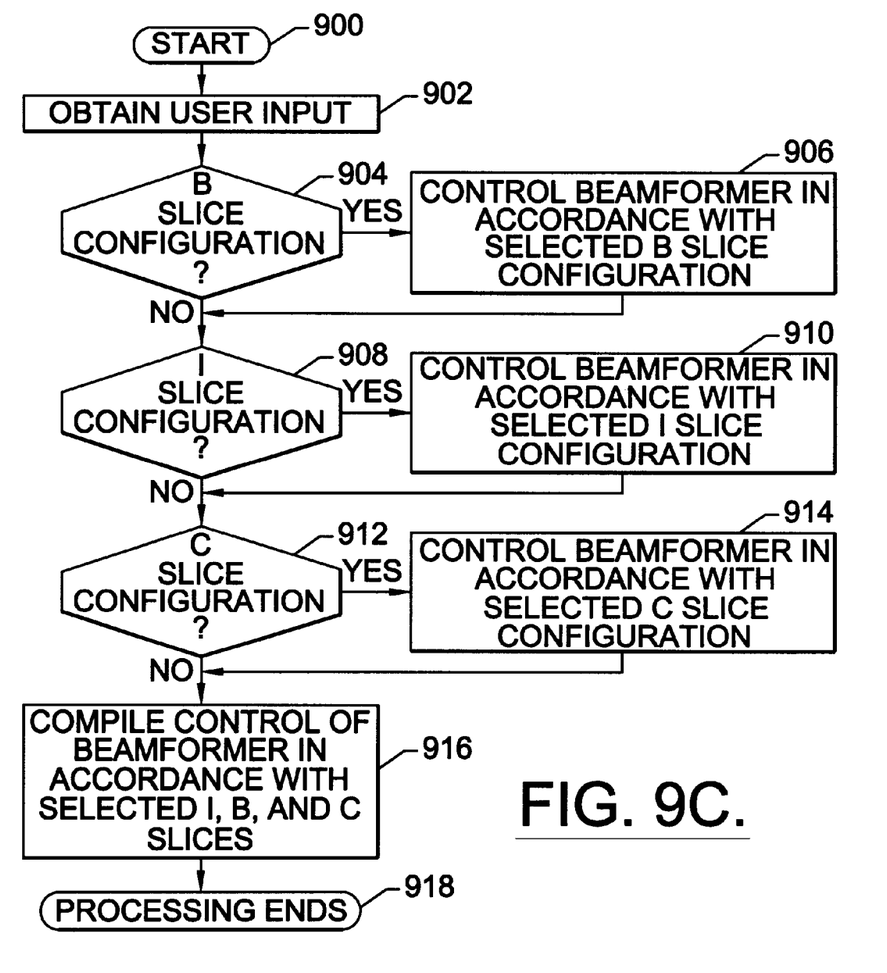
FIG. 9C is a flow chart that illustrates operations of a 3D ultrasound imaging system according to the present invention.

FIG. 9C is a flow chart that illustrates operations of a 3D ultrasound imaging system according to the present invention. As shown in FIG. 9C, processing starts in block 900. The system obtains the user selection of slice configurations (block 902). If the user selects a configuration of slices including a B slice (block 904), the processor selects the instructions needed to control the B slice scanning (906). If the user selects a configuration of slices including an I slice (block 908), the processor selects the instructions needed to control the I slice scanning (block 910). If the user selects a configuration of slices including a C slice (block 912), the processor selects the instructions needed to control the C slice scanning (914). All of the instructions generated by the processor for the control of the beamformer, based on the configuration of slices selected by the user, are compiled into an overall set of controls needed to scan the volume in accordance with the configuration of slices selected by the user, whereupon processing ends in block 918.

As will be appreciated by one of skill in the art, the present invention may be embodied as a method, data processing system or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including, but not limited to, hard disks, CD-ROMs, optical storage devices, magnetic storage devices, and electronic storage devices.

The present invention is also described above using a flowchart illustration. It will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of scanning a volume downstream from an ultrasound transducer using ultrasound beams, the method comprising the steps of:

selecting at least one slice of the volume that is upstream from a scan range of the volume; and scanning a first portion of the volume defined by the at least one slice that is less than the volume at a scan rate that is based on a ratio of a volume of the first portion to the volume by eliminating scanning of a second portion of the volume that extends downstream from the at least one slice to the scan range.

2. The method of claim 1, wherein the step of selecting comprises the step of selecting at least a point in the volume to define the at least one slice.

3. A method of scanning a volume in body using ultrasound beams, the method comprising the steps of:

selecting at least one slice of the volume;

scanning a first portion of the volume defined by the at least one slice that is less than the volume at a scan rate that is based on a ratio of a volume of the first portion to the volume by eliminating scanning of a second portion of the volume that is separate from the first portion; and wherein the step of scanning comprises the steps of:

transmitting a plurality of transmit ultrasound beams downstream from an ultrasound transducer through the at least one slice of the volume to a scan range of the volume, wherein the at least one slice is located upstream in the volume from the scan range; and tracking the plurality of transmit ultrasound beams downstream from the ultrasound transducer through the first portion of the volume to form a plurality of ultrasound scan lines until the plurality of transmit ultrasound beams reach respective locations in the at least one slice.

4. The method of claim 3, wherein the at least one slice comprises an I slice or a C slice.

5. The method of claim 3, wherein the step of tracking comprises the step of tracking the plurality of transmit ultrasound beams downstream to form a plurality of ultrasound scan lines using parallel receive processing.

6. The method according to claim 3, wherein the transmit ultrasound beams are used to provide one of M-mode, spectral Doppler, color flow, or power mode data associated with the at least one slice.

7. The method of claim 3, wherein the plurality of ultrasound beams are tracked downstream to the at least one slice until first and second B slices within the first portion are scanned.

8. The method of claim 7, wherein one of the first and second B slices defines a non-orthogonal angle with respect to a face of the ultrasound transducer.

9. A system that scans a volume in a body using ultrasound beams, the system comprising:
   an ultrasound transducer that transmits transmit ultrasound beams downstream through a slice of the volume to a scan range of the volume;
   a beamformer, responsive to the ultrasound transducer, that tracks the transmit ultrasound beams to form ultrasound scan lines;
   a processor that controls the tracking performed by the beamformer so that the transmit ultrasound beams are tracked downstream from the ultrasound transducer until the transmit ultrasound beams reach respective locations in the slice that is upstream in the volume from the scan range and that generates a 3D data set based on the tracking of the transmit ultrasound beams; and
   a display, responsive to the processor, that displays a view of the slice based on the 3D data set.

10. The system of claim 9, wherein the slice is selected from a group consisting of an I slice and a C slice.

11. The system of claim 9 wherein the transmit ultrasound beams are used to provide one of M-mode, spectral Doppler, color flow, or power mode data associated with the at least one slice.

12. A system that scans a volume in a body using ultrasound beams, the system comprising:
   an ultrasound transducer that transmits a plurality of transmit ultrasound beams downstream from the ultrasound transducer;
   a beamformer, responsive to the ultrasound transducer, that tracks the plurality of transmit ultrasound beams downstream from the ultrasound transducer to form a plurality of ultrasound scan lines;
   a processor that controls the transmission of the plurality of transmit ultrasound beams from the ultrasound transducer so that the plurality of transmit ultrasound beams are transmitted until first and second B slices within the volume are scanned, wherein one of the first and second B slices within the volume defines a non-orthogonal angle with respect to a face of the ultrasound transducer and converts the plurality of ultrasound scan lines into a 3D data set; and
   a display, responsive to the processor, that displays views of the first and second B slices based on the 3D data set.

13. The system of claim 12, wherein the beamformer tracks the plurality of transmit ultrasound beams downstream to form a plurality of ultrasound scan lines using parallel receive processing.

14. The system of claim 12, wherein the plurality of transmit ultrasound beams are transmitted downstream from an ultrasound transducer through a third slice of the volume to a scan range of the volume, wherein the third slice is located upstream in the volume from the scan range; and wherein the plurality of transmit ultrasound beams are tracked downstream from the ultrasound transducer until the plurality of transmit ultrasound beams reach respective locations that lie in the third slice.

15. The system of claim 14, wherein the third slice comprises one of an I slice or a C slice.

16. A system that scans a volume downstream from an ultrasound transducer using ultrasound beams, the system comprising:
   means for selecting at least one slice of the volume that is upstream from a scan range of the volume; and
   means for scanning a first portion of the volume defined by the at least one slice that is less than the volume at a scan rate that is based on a ratio of a volume of the first portion to the volume by eliminating scanning of a second portion of the volume that extends downstream from the at least one slice to the scan range.

17. The method of claim 16, wherein the means for selecting comprises means for selecting at least a point in the volume to define the at least one slice.

18. A system that scans a volume in a body using ultrasound beams, the system comprising:
   means for selecting at least one slice of the volume;
   means for scanning a first portion of the volume defined by the at least one slice that is less than the volume at a scan rate that is based on a ratio of a volume of the first portion to the volume by eliminating scanning of a second portion of the volume that is separate from the first portion; and
   wherein the means for scanning comprises:
      means for transmitting a plurality of transmit ultrasound beams downstream from an ultrasound transducer through the at least one slice of the volume to a scan range of the volume, wherein the at least one slice is located upstream in the volume from the scan range; and
      means for tracking the plurality of transmit ultrasound beams downstream from the ultrasound transducer through the first portion of the volume to form a plurality of ultrasound scan lines until the plurality of transmit ultrasound beams reach respective locations in the at least one slice.

19. The system of claim 18, wherein the at least one slice comprises one of an I slice or a C slice.

20. The system of claim 18, wherein the means for tracking comprises means for tracking the plurality of transmit ultrasound beams downstream to form a plurality of ultrasound scan lines using parallel receive processing.

21. The system of claim 18, wherein the transmit ultrasound beams are used to provide one of M-mode, spectral Doppler, color flow, or power mode data associated with the at least one slice.

22. The method of claim 18, wherein the means for tracking tracks the plurality of ultrasound beams downstream to the at least one slice until first and second B slices within the first portion are scanned.

23. The method of claim 21, wherein one of the first and second B slices defines a non-orthogonal angle with respect to a face of the ultrasound transducer.

24. A method of scanning using ultrasound beams, the method comprising the steps of:
   selecting at least one point in the volume to define at least one slice of the volume;
   transmitting a plurality of transmit ultrasound beams downstream from an ultrasound transducer through the at least one slice of the volume to a scan range of the volume, wherein the at least one slice is located upstream in the volume from the scan range; and
   tracking the plurality of transmit ultrasound beams downstream from the ultrasound transducer through a first portion of the volume to form a plurality of ultrasound scan lines until the plurality of transmit ultrasound beams reach respective locations in the at least one slice to eliminate scanning of a second portion of the volume that is downstream in the volume from the at least one slice.

25. A system that scans using ultrasound beams, the system comprising:

means for selecting at least one point in a volume to define at least one slice of the volume;

means for transmitting a plurality of transmit ultrasound beams downstream from an ultrasound transducer through the at least one slice of the volume to a scan range of the volume, wherein the at least one slice is located upstream in the volume from the scan range; and means for tracking the plurality of transmit ultrasound beams downstream from the ultrasound transducer through a first portion of the volume to form a plurality of ultrasound scan lines until the plurality of transmit ultrasound beams reach respective locations in the at least one slice to eliminate scanning of a second portion of the volume that is downstream in the volume from the at least one slice.

26. A method of scanning a volume downstream from an ultrasound transducer using ultrasound beams, the method comprising the steps of:

selecting at least one planar slice of the volume; and scanning a first portion of the volume defined by the at least one slice that is less than the volume by eliminating scanning of a second portion of the volume that extends downstream from the at least one slice.

27. The method according to claim 26, wherein the planar slice is defined by a general planar equation.

28. A method of scanning a volume downstream from an ultrasound transducer using ultrasound beams, the method comprising the steps of:

selecting at least one slice of the volume prior to scanning the volume; and scanning a first portion of the volume defined by the at least one slice that is less than the volume by eliminating scanning of a second portion of the volume that extends downstream from the at least one slice.

29. A method of scanning a volume downstream from an ultrasound transducer using ultrasound beams, the method comprising the steps of:

selecting a first slice of the volume;

scanning a first portion of the volume defined by the first slice that is less than the volume by eliminating scanning of a second portion of the volume that extends downstream from the first slice to a scan range of the volume;

selecting a second slice of the volume that is upstream in the volume from first slice; and scanning a third portion of the volume defined by the second slice that is less than the volume by eliminating scanning of a fourth portion of the volume that extends downstream from the second slice to the scan range.

30. The method according to claim 29, wherein the first portion is scanned at a first scan rate and the third portion is scanned a second scan rate that is greater than the first scan rate.

* * * * *